(12) United States Patent
Stewart et al.

(10) Patent No.: US 8,458,558 B2
(45) Date of Patent: Jun. 4, 2013

(54) MULTI-ANTENNA CONFIGURATION SIGNALING IN WIRELESS COMMUNICATION SYSTEM

(75) Inventors: Kenneth A. Stewart, Grayslake, IL (US); Tyler A. Brown, Mundelein, IL (US); Robert T. Love, Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1347 days.

(21) Appl. No.: 12/112,577

(22) Filed: Apr. 30, 2008

(65) Prior Publication Data

US 2009/0276684 A1    Nov. 5, 2009

(51) Int. Cl.
*G06F 11/00* (2006.01)
(52) U.S. Cl.
USPC .......................................................... 714/758
(58) Field of Classification Search
USPC ........................................................... 714/758
See application file for complete search history.

(56) References Cited

U.S. PATENT DOCUMENTS

| | | | | |
|---|---|---|---|---|
| 5,862,160 | A * | 1/1999 | Irvin et al. | 714/807 |
| 6,678,854 | B1 * | 1/2004 | Irvin | 714/752 |
| 6,738,946 | B1 * | 5/2004 | Irvin | 714/776 |
| 7,149,538 | B2 | 12/2006 | Lindoff et al. | |
| 7,318,185 | B2 | 1/2008 | Khandani et al. | |
| 7,697,483 | B2 * | 4/2010 | Usuda et al. | 370/331 |
| 7,986,758 | B2 | 7/2011 | Lindoff et al. | |
| 8,290,088 | B2 | 10/2012 | Callard et al. | |
| 2002/0194571 | A1 * | 12/2002 | Parr et al. | 714/800 |
| 2003/0060173 | A1 * | 3/2003 | Lee et al. | 455/103 |
| 2005/0250454 | A1 | 11/2005 | Sebire et al. | |
| 2006/0067229 | A1 | 3/2006 | Frederiksen | |
| 2006/0285515 | A1 | 12/2006 | Julian et al. | |
| 2007/0025454 | A1 | 2/2007 | Jones et al. | |
| 2007/0195809 | A1 | 8/2007 | Blanz et al. | |
| 2008/0146242 | A1 | 6/2008 | Alanara et al. | |
| 2008/0192872 | A1 | 8/2008 | Lindoff | |
| 2008/0285512 | A1 | 11/2008 | Pan et al. | |
| 2009/0037797 | A1 | 2/2009 | Spencer et al. | |

(Continued)

FOREIGN PATENT DOCUMENTS

| | | |
|---|---|---|
| CN | 1883217 A | 12/2006 |
| EP | 1881662 A1 | 1/2008 |

(Continued)

OTHER PUBLICATIONS

PCT Search Report and Written Opinion; Mar. 4, 2010; PCT/US2009/042215; 18 pages.

(Continued)

*Primary Examiner* — Bryce Bonzo
*Assistant Examiner* — Elmira Mehrmanesh

(57) ABSTRACT

A wireless communication infrastructure entity (200) having a communication configuration is configured to generate parity bits based on an information word and to encode the parity bits based on the communication configuration of the wireless communication infrastructure entity, wherein the encoded parity bits are combined with the information word. A wireless communication user terminal is configured to identify a set of configuration indicator bits used to encode parity bits combined with an information word and to determine a communication configuration of the wireless communication entity from which the combination of the information word and the encoded parity bits were received based on the set of configuration indicator bits used to encode the parity bits.

6 Claims, 4 Drawing Sheets

U.S. PATENT DOCUMENTS

| | | | |
|---|---|---|---|
| 2009/0122776 A1 | 5/2009 | Folkstedt et al. | |
| 2009/0149207 A1* | 6/2009 | Zhang et al. | 455/500 |
| 2009/0176463 A1* | 7/2009 | Raaf et al. | 455/101 |
| 2009/0197630 A1 | 8/2009 | Ahn et al. | |
| 2009/0221293 A1 | 9/2009 | Petrovic et al. | |
| 2009/0245194 A1 | 10/2009 | Damnjanovic et al. | |
| 2009/0262854 A1 | 10/2009 | Lee et al. | |
| 2009/0279460 A1 | 11/2009 | Sarkar | |
| 2009/0325589 A1 | 12/2009 | Michel et al. | |
| 2010/0238875 A1 | 9/2010 | Sung et al. | |
| 2010/0272037 A1 | 10/2010 | Lee et al. | |

FOREIGN PATENT DOCUMENTS

| | | |
|---|---|---|
| JP | 2007-511965 A | 5/2007 |
| JP | 2011-517259 A | 5/2011 |
| WO | 0182543 A2 | 11/2001 |
| WO | 2005048625 A1 | 5/2005 |
| WO | 2005050852 A2 | 6/2005 |
| WO | 2008024788 A2 | 2/2008 |
| WO | 2009129343 A1 | 10/2009 |

OTHER PUBLICATIONS

3GPP TSG RAN1 #51; Sevilla, Spain; Jan. 14-18, 2008; Motorola; Antenna Configuration Detection Based on Reference Signal Energy; R1-080434; 12 pages.

3GPP TSG RAN WG1 #52 Meeting; Sorrento, Italy, Feb. 11-15, 2008; Nokia Siemens Networks, Nokia; CRC Mask Selection for PBCH; R1-081073; 8 pages.

3GPP TSG RAN1 #51bis Meeting; Sevilla, Spain; Jan. 14-18, 2008; Nokia Siemens Networks, Nokia, China Mobile, Huawei; Issues with PBCH-based Blind Antenna Configuration Detection; R1-080324; 8 pages.

3GPP TSG RAN WG1 #51bis Meeting; Sevilla, Spain; Jan. 14-18, 2008; Nokia Siemens Networks, Nokia, Panasonic, Texas Instruments, Motorola, Samsung, CMCC, CATT, Ericsson, Nortel, Huawei, LGE; Way Forward on PBCH for FDD and TDD; R1-080586; 2 pages.

USPTO; U.S. Appl. No. 12/188,053, filed Aug. 7, 2008; Confirmation #4233.

PCT Search Report and Written Opinion; Mar. 4, 2010; PCT/US2009/050346; 18 pages.

3GPP TSG RAN1 #48bis; Malta; Mar. 26-30, 2007; Motorola; E-UTRA DL L1/L2 Control Channel Design; R1-071353; 6 pages.

3GPP TSG-RAN WG2 Meeting #61; Sorrento, Italy; Feb. 11-15, 2008; Qualcomm Europe; Allocation of Semi-Persistent Resources; R2-081072; 1 page.

3GPP TSG RAN1 #53; Kansas City, USA; May 5-9, 2008; Motorola; Definition of DCI Format 1C; R1-082059; 6 pages.

3GPP TSG RAN1 #53bis.; Warsaw Poland; Jun. 30-Jul. 4, 2008; Motorola; Further Definition of DCI Format 1C; R1-082333; 9 pages.

3GPP TSG RAN WG1 #51 Meeting; R1-074861; Jeju, Korea; Nov. 5-9, 2007; 5 Pages.

3GPP TSG-RAN Meeting #50-BIS; R1-073970; Shanghai, China; Oct. 8-12, 2007; 9 Pages.

United States Patent and Trademark Office, "Non-Final Rejection" for U.S. Appl. No. 12/188,053 May 3, 2011, 22 pages.

3GPP TSG RAN WG1 #51BIS Meeting; R1-080586; Sevilla, Spain; January. 14-18, 2008; 1 Page.

United States Patent and Trademark Office, "Non-Final Rejection" for U.S. Appl. No. 12/188,053 Oct. 14, 2011, 23 pages.

Japan Notice of Reasons for Rejection (Translated) for Application No. 2009-174876 dated Oct. 18, 2011, 3 pages.

European Patent Office, "Extended Search Report" for European Application No. 12000351.2 Apr. 26, 2012, 5 pages.

3GPP TSG RAN WG1 #52, R1-080869 "Summary of Email Discussion on DL Control Signaling" Ericsson, Sorrento, Italy, Feb. 11-15, 2008, 8 pages.

3GPP TSG RAN WG1 #51bis, R1-080328 "Remaining Issues on RV Signalling for HARQ" Nokia Siemens Networks et al., Sevilla, Spain, Jan. 14-18, 2008, 5 pages.

3GPP TSG RAN WG1 #AH , R1-041072 "HARQ Protocol for HSUPA" Panasonic, Seoul, Korea Sep. 20-24, 2004, 3 pages.

European Patent Office, "Extended Search Report" for European Application No. 12000352.0 Apr. 26, 2012, 5 pages.

United States Patent and Trademark Office, "Non-Final Rejection" for U.S. Appl. No. 13/399,020 Dec. 6, 2012, 9 pages.

United States Patent and Trademark Office, "Non-Final Rejection" for U.S. Appl. No. 13/417,478 Jan. 4, 2013, 20 pages.

The State Intellectual Property Office of the Pople's Republic of China "Notification of the First Office Action" for Chinese Patent Appliction No. 200980114902.5 dated Jan. 4, 2013, 6 pages.

European Patent Office "European Extended Search Report" for European Patent Application No. 12193643.9 dated Feb. 7, 2013, 7 pages.

European Patent Office "European Extended Search Report" for European Patent Application No. 12193645.4 dated Feb. 7, 2013, 7 pages.

European Patent Office "European Extended Search Report" for European Patent Application No. 12193646.2 dated Feb. 7, 2013, 6 pages.

3GPP TSG RAN WG2 #59bis; R2-074159 "Radio Connection Control IEs" Panasonic; Shanghai, China; Oct. 8-12, 2007; 19 pages.

* cited by examiner

MULTI-ANTENNA CONFIGURATION SIGNALING IN WIRELESS COMMUNICATION SYSTEM

FIELD OF THE DISCLOSURE

The present disclosure relates generally to wireless communications and more particularly to multi-antenna configuration signaling in wireless communication systems.

BACKGROUND

The 3$^{rd}$ Generation Partnership Project (3GPP) Long Term Evolution (LTE) of the Universal Mobile Telecommunications Systems (UMTS) is expected to permit up to 4 antenna ports to be defined for multi-antenna base station transmissions and to permit using 1, 2 or 4 antenna ports for selected physical channel transmissions. The Physical Broadcast Channel (PBCH) may be transmitted using all three of these latter antenna port configurations. Since the base station does not explicitly signal the antenna configuration via the synchronization channel, the user equipment (UE) is required to decode the PBCH without the assistance of base station antenna configuration information acquired during an earlier phase of the initial network access procedure. In particular, the PBCH-borne Master Information Block is transmitted as a convolutionally encoded codeword with an inner cyclic redundancy check (CRC), but it is possible even at high signal-to-noise ratios for the UE to fail to identify the number of antennas present solely by inspection of the common reference symbols (RS). Similarly, it is possible for the UE to incorrectly identify the base station antenna configuration when hypothesis-testing the transmit diversity scheme associated with each permitted antenna configuration in combination with a PBCH CRC testing. For example, when transmitting using the specified 2 antenna transmit diversity scheme of space-frequency block coding (SFBC), a UE can correctly decode the PBCH codeword when hypothesizing (incorrectly) 1 antenna transmission.

3GPP R1-073970 discloses several possible approaches to communicating base station antenna configuration information for corresponding PBCH transmissions. In one approach, the mapping of a PBCH codeword to OFDM symbols and sub-carriers (i.e., resource elements) is changed according to the multi-antenna configuration. 3GPP R1-074861 suggests, however, that the mapping of the PBCH codeword onto resource elements should not vary with the antenna configuration. According to a second approach, the PBCH codeword is scrambled with different scrambling sequences, wherein the sequence is conditioned on the base station antenna configuration. This approach requires the UE to de-scramble the log-likelihood ratios (LLRs) arising from each hypothesized multi-antenna configuration prior to attempting convolutional decoding and CRC checking. In this second approach, one descrambling operation is required for each antenna configuration hypothesis. A third approach requires changing the Alamouti code (SFBC or SFBC+FSTD) according to the antenna configuration. This would require the UE to support more transmit diversity mapping configurations. Accordingly, some further, low complexity means of assisting the UE in discriminating the antenna configuration is needed.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
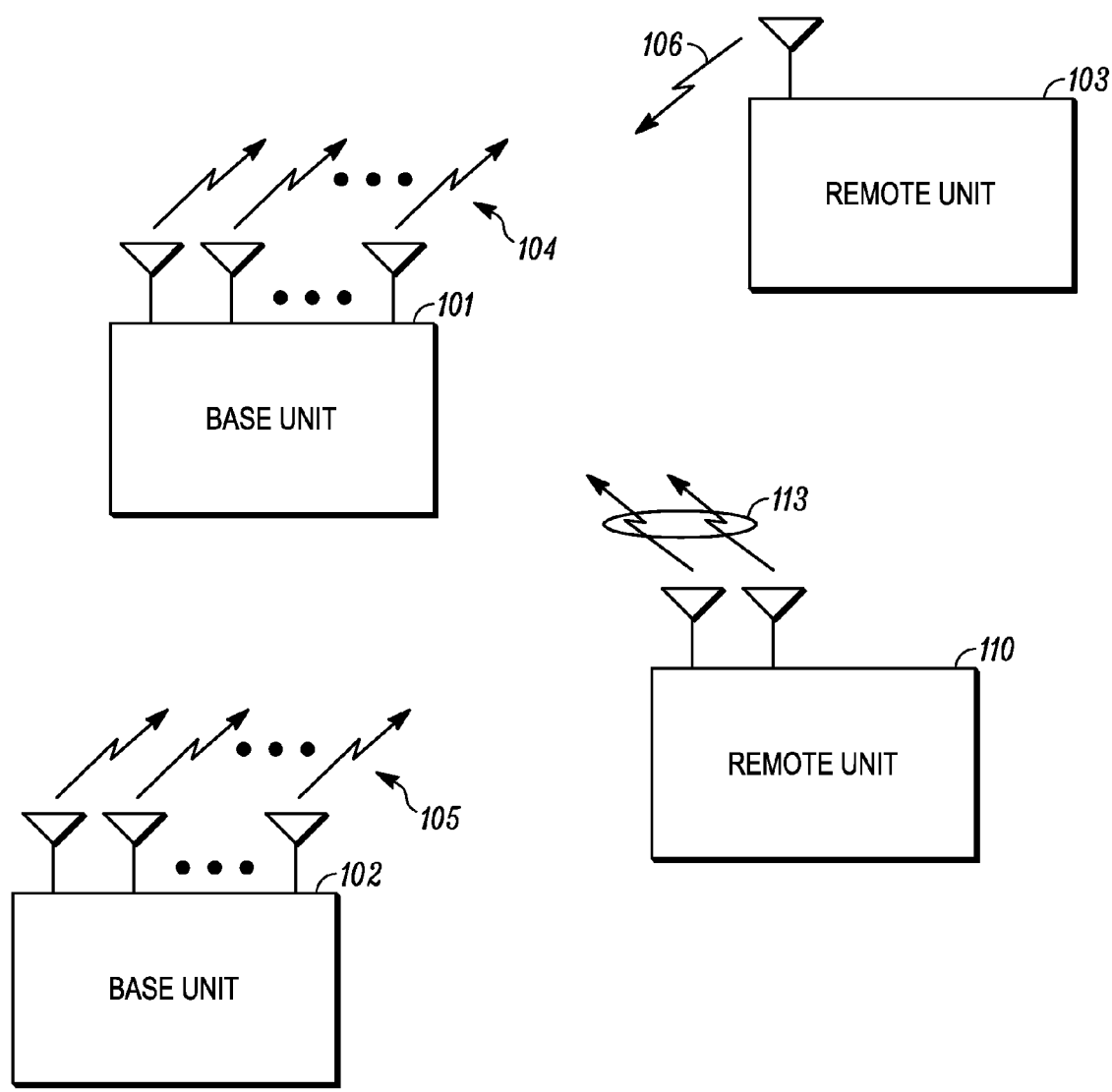
FIG. 1 illustrates a wireless communication system.

In FIG. 1, a wireless communication system 100 comprises one or more fixed base infrastructure units forming a network distributed over a geographical region. The base unit may also be referred to as an access point, access terminal, base, base station, Node-B, eNode-B or by other terminology used in the art. In FIG. 1, the one or more base units 101 and 102 serve a number of remote units 103 and 110 within a serving area, for example, a cell or a cell sector. The remote units may be fixed units or mobile terminals. The remote units may also be referred to as subscriber units, mobiles, mobile stations, users, terminals, subscriber stations, user equipment (UE), terminals, or by other terminology used in the art.

Generally, the base units 101 and 102 transmit downlink communication signals 104 and 105 to serve remote units in the time and/or frequency domain. The remote units 103 and 110 communicate with the one or more base units via uplink communication signals 106 and 113. The one or more base units may comprise one or more transmitters and one or more receivers for downlink and uplink transmissions. The remote units may also comprise one or more transmitters and one or more receivers.

In one implementation, the wireless communication system is compliant with the developing Long Term Evolution (LTE) of the 3GPP Universal Mobile Telecommunications System (UMTS) protocol wherein base stations transmit using an orthogonal frequency division multiplexing (OFDM) modulation scheme on the downlink and the user terminals transmit on the uplink using a single carrier frequency division multiple access (SC-FDMA) scheme. More generally, however, the wireless communication system may implement some other open or proprietary communication protocol. The present disclosure is not intended to be limited to the implementation of any particular wireless communication system architecture or protocol.

In some systems, each base station, and more generally some other wireless communication infrastructure entity, has a communication configuration. In one embodiment, the communication configuration is an antenna configuration of the base station. In 3GPP, for example, the Long Term Evolution (LTE) of Universal Mobile Telecommunications Systems (UMTS) is expected to permit up to 4 antenna ports to be defined for multi-antenna base station transmissions and to permit using 1, 2 or 4 antenna ports for selected physical channel transmissions. The Physical Broadcast Channel (PBCH) may be transmitted using all three of these latter antenna port configurations. Thus the multiple base stations that constitute a wireless communication system may potentially have different antenna configurations. Also, in some system implementations, the antenna configuration of the one or more base terminals is changed dynamically.

In 3GPP, currently, the UE is required to decode the PBCH without the assistance of base station antenna configuration information acquired during an earlier phase of the initial network access procedure since the base station does not explicitly signal the antenna configuration via the synchronization channel. Accordingly, a means for assisting the UE in discriminating the antenna configuration of the base station is desired in some instances, particularly where neighboring base stations have different configurations and/or where the antenna configuration of the base station changes dynamically. There may also be instances where it is desirable for the base station to signal the transmit antenna configuration that should be adopted by the terminal.

The present disclosure is not intended to be limited to communicating or assisting a user terminal with the determination of the antenna configuration of a particular base unit. More generally, the wireless communication infrastructure entity may assist one or more entities with the determination of a communication configuration of the wireless communication infrastructure entity or with the determination of the communication configuration of or for the wireless communication terminal. For example, the communication configuration information may be in the form of any one or more of the following: the antenna configuration of the wireless communication terminal; information on cell identity information (this can sometimes be transferred by association with, e.g., a synchronization channel identifier); information concerning the duration of frame or slot structure; the configuration of the cell as a paired, e.g., frequency-division duplexing (FDD) or unpaired, e.g. time-division duplexing, (TDD) transmission; symmetric or asymmetric downlink and uplink frequency resources; the type and/or number of transmitted pilot or reference symbols; whether broadcast or unicast service is supported; the presence of superposed channel transmissions; admission control data; the association of adjacent or non-adjacent spectrum; the number of accessible carriers or carrier relationships in case of a multi-carrier structure; the cell and carrier type and relationship to other cells in a hierarchical cell structure or multi-carrier hierarchical cell structure; a dedicated broadcast carrier in an SFN; among other information.

Figure 2:
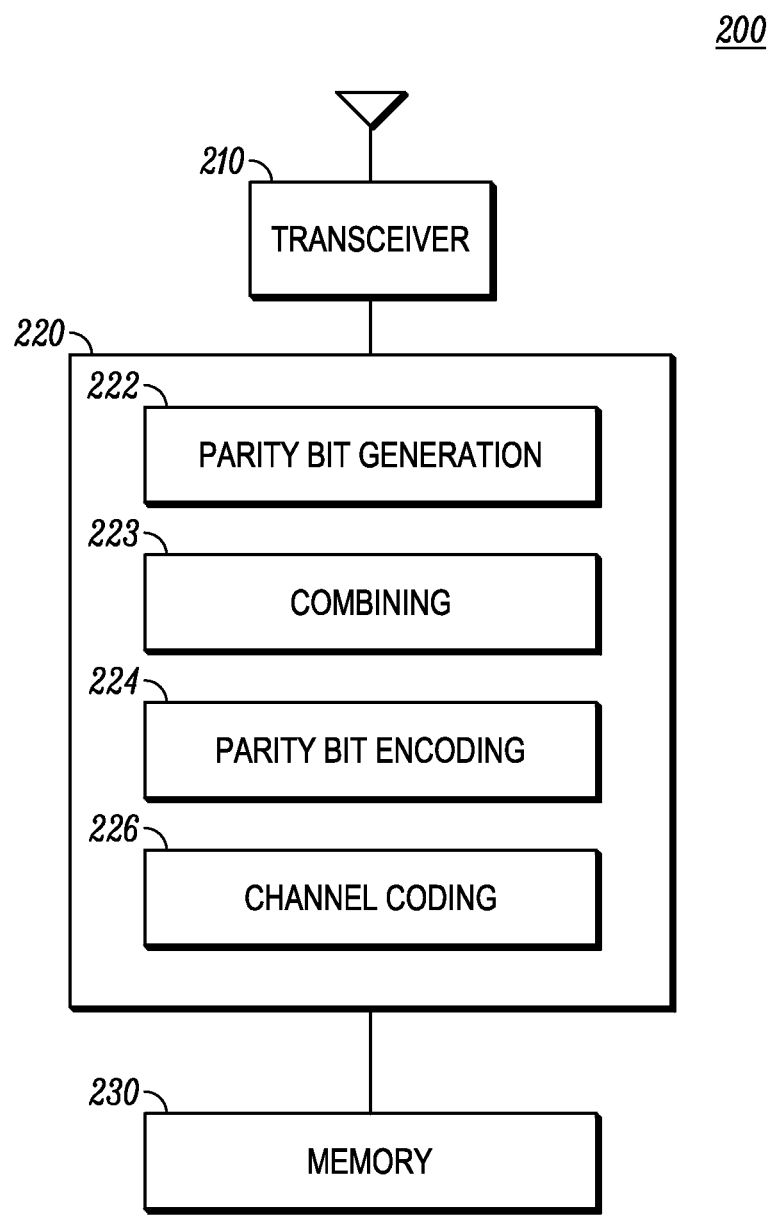
FIG. 2 is a wireless communication infrastructure entity block diagram.

In FIG. 2, a wireless communication infrastructure entity 200 having a communication configuration comprises a transceiver 210 communicably coupled a controller 220. In one embodiment, the wireless communication infrastructure entity corresponds to one of the base units of FIG. 1 wherein the communication configuration is an antenna configuration. The transceiver generally communicates with one or more user terminals within its coverage area. In FIG. 2, the controller is most readily implemented as a digital processor controlled by software and/or firmware stored in memory 230. Alternatively however the controller may be implemented as a hardware equivalent device or as a combination of hardware and software. The controller includes parity bit generation functionality 222 used to generate parity bits based on an information word that is to be transmitted to a user terminal. Thus under software and/or firmware control, the controller is configured to generate parity bits based on an information word. In the process flow diagram 300 of FIG. 3, at 310, the wireless communication network infrastructure entity generate parity bits, for example, Cyclic Redundancy Check (CRC) bits based on an information word, for example a transport block. In FIG. 2, at 223, the parity bits are combined with the information word.

In FIG. 2, the controller includes parity bit encoding functionality 224 used to encode communication configuration information of the wireless communication infrastructure entity on the parity bits. The controller is configured to encode the parity bits based on the communication configuration of the wireless communication infrastructure entity under software and/or firmware control. In other embodiments, more generally, other communication configuration information could be encoded on the parity bits. In one embodiment, the controller is configured to encode the parity bits by masking the parity bits with a unique set of configuration indicator bits corresponding to the communication configuration of the wireless communication infrastructure entity. In one implementation, the masking may be performed by XOR-ing the parity bits with the set of configuration indicator bits. The mask could be generated by, for example, selecting 3 length-N masking words where N is the PBCH CRC parity field length (and is likely 16 bits) with maximum Hamming distance. Such a set of masking words could include, for example, the all-zero or null masking word corresponding to the 1 antenna configuration without loss of generality. By extending the number of states and therefore the number of applicable masks, any further information relating to the base station antenna configuration could also be encoded.

The mask or parity field modifier could also be conditioned on the base station physical cell ID, or the duration of a frame or slot structure, or the configuration of the cell as a paired, e.g., frequency-division duplexing (FDD) or unpaired, e.g., time-division duplexing, (TDD) transmission, symmetric or asymmetric downlink and uplink frequency resources, the type and number of transmitted pilot or reference symbols, the type of service supported (e.g., broadcast, unicast), the presence of superposed channel transmissions, admission control data, the association of adjacent or non-adjacent spectrum, the number of accessible carriers or carrier relationships in case of a multi-carrier structure, the cell and carrier type and relationship to other cells in a hierarchical cell structure or multi-carrier hierarchical cell structure, among other communication configuration information, some examples of which are discussed above.

The information word is generally combined or otherwise associated with the encoded parity bits before transmission to the user terminal. In one embodiment, the controller is configured to combine the information word and the parity bits by concatenating the parity bits to the information word, for example, at the beginning or end thereof, before or after the parity bits are encoded. Alternatively, the parity bits may be inserted into a mid portion of the information word or the parity bit may be interleaved with the information word before or after encoding.

Figure 3:
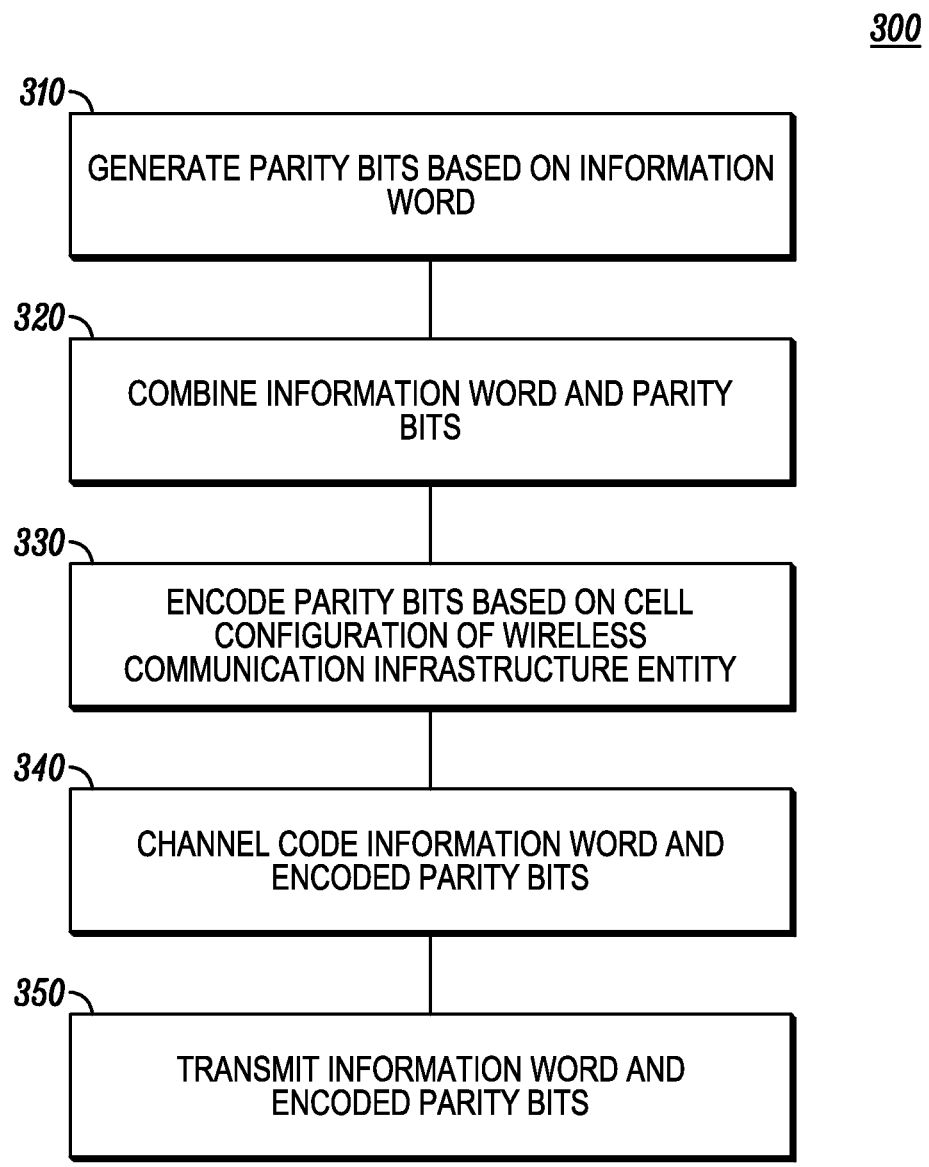
FIG. 3 is a wireless communication infrastructure entity process flow diagram.

In FIG. 3, at block 320, the wireless communication infrastructure entity combines the information word and the parity bits and then at 330 encodes the parity bits based on the communication configuration of the wireless communication infrastructure entity. In an alternative embodiment, the parity bits are first encoded and then combined with the information word. Thus in FIG. 2, the spatial location or the order of the combining functionality is not necessarily indicative of order in which it occurs relative to the parity bit encoding function. In some embodiments, in FIG. 2, the controller includes channel coding functionality used to channel code the information word and the combined encoded parity bits before transmitting. In FIG. 3, at 340, the information word combined with the encoded parity bits are channel coded before transmission at 350. In FIG. 2, the controller communicates the channel coded information word and parity bits to the transceiver for transmission.

Figure 4:
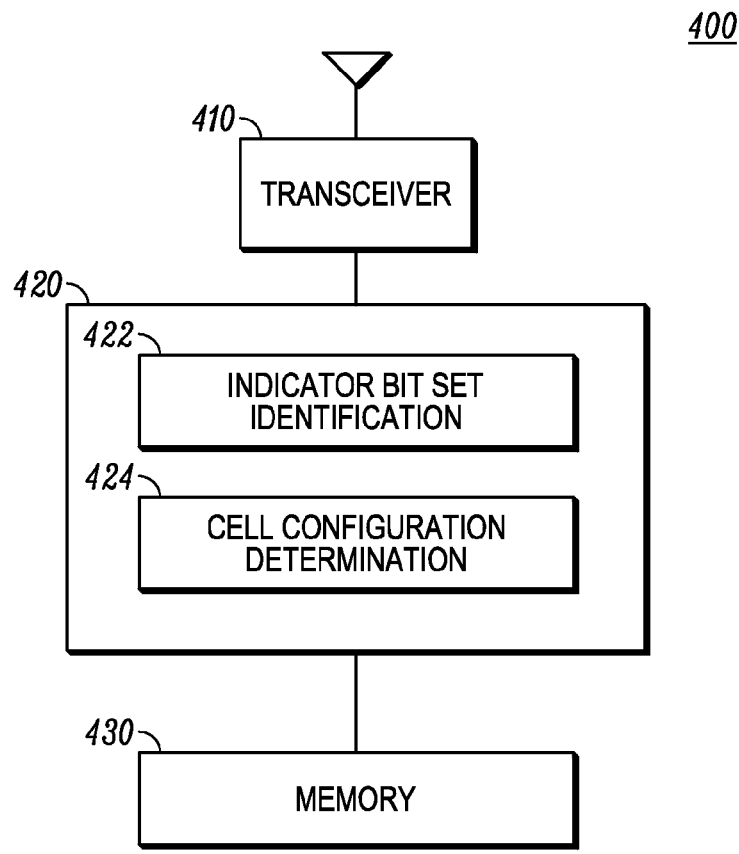
FIG. 4 is a wireless communication user terminal block diagram.

In FIG. 4, a wireless communication user terminal 400 comprises a transceiver 410 communicably coupled a controller 420. In one embodiment, the user terminal corresponds to one of the remote units of FIG. 1. The transceiver generally communicates with one or more base units. In FIG. 4, the controller is most readily implemented as a digital processor controlled by software and/or firmware stored in memory 430. Alternatively however the controller may be implemented as a hardware equivalent device or as a combination of hardware and software. In the process flow diagram 500 of FIG. 5, at 510, the user terminal receives an information word combined with encoded parity bits from a wireless communication entity.

In FIG. 4, the controller includes functionality 422 used to identify a set of configuration indicator bits used to encode parity bits that are combined with an information word. In FIG. 4, the controller also includes functionality 424 used to determine a communication configuration based on the set of configuration indicator bits used to encode the parity bits. In one embodiment, the controller is configured to determine a communication configuration of the wireless communication entity from which the combination of the information word and the encoded parity bits were received based on the set of configuration indicator bits used to encode the parity bits. In another embodiment, the controller is configured to determine a communication configuration of the wireless communication user terminal based on the set of configuration indicator bits used to encode the parity bits.

Figure 5:
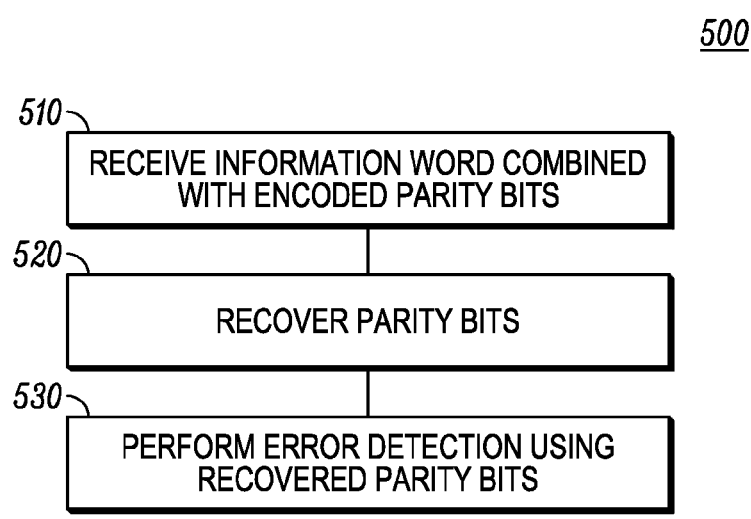
FIG. 5 is a wireless communication user terminal process flow diagram.

In one implementation illustrated in FIG. 5, at 520, the user terminal recovers the parity bits from the encoded parity bits. In one embodiment, the parity bits are recovered by XOR-ing the encoded parity bits with a set of configuration indicator bits. At 530, the user terminal performs error detection on an information word using the recovered parity bits. In one embodiment, the user terminal performs the XOR-ing process for each possible set of configuration indicator bits, wherein the set of configuration indicator bits indicative of the communication configuration of the wireless communication entity corresponds to the set of configuration indicator bits for which the detected errors in the information word is relatively low. For example, the errors detected may be zero or at least less than the detected error associated with the other configuration indicator bits. The communication configuration of the wireless communication entity is indicated by not more than one set of configuration indicator bits.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope of the inventions, which are to be limited not by the exemplary embodiments but by the appended claims.

What is claimed is:

1. A wireless communication user terminal, comprising:
a transceiver;
a controller communicably coupled to the transceiver,
the controller configured to identify a set of configuration indicator bits used to encode parity bits that are combined with an information word, wherein the encoded parity bits combined with the information word are received by the transceiver from a wireless communication entity before the controller identifies the set of configuration bits,
the controller configured to determine a communication configuration based on the set of configuration indicator bits used to encode the parity bits,
the controller configured to recover parity bits from the encoded parity bits by XOR-ing the encoded parity bits with the set of configuration indicator bits,
the controller configured to perform error detection on the information word using the parity bits after recovering,
wherein the set of configuration indicator bits are indicative of the communication configuration if detected error in the information word is relatively low.

2. A wireless communication user terminal, comprising:
a transceiver;
a controller communicably coupled to the transceiver,
the controller configured to identify a set of configuration indicator bits used to encode parity bits that are combined with an information word, wherein the encoded parity bits combined with the information word are received by the transceiver from a wireless communication entity before the controller identifies the set of configuration bits,
the controller configured to determine a communication configuration based on the set of configuration indicator bits used to encode the parity bits,
the controller configured to recover the parity bits from the encoded parity bits by XOR-ing the encoded parity bits with each of at least two different sets of configuration indicator bits to generate corresponding sets of parity bits,
the controller configured to perform error detection on the information word using each set of parity bits after recovering,
the identified set of configuration indicator bits corresponds to a set of configuration indicator bits used to generate a set of parity bits for which detected errors in the information word are relatively low,
the communication configuration is indicated by not more than one set of configuration indicator bits.

3. A base station having a communication configuration, the base station comprising:
a transceiver;
a controller communicably coupled to the transceiver,
the controller configured to generate parity bits based on an information word,
the controller configured to encode the parity bits based on the communication configuration of the base station, the encoded parity bits combined with the information word,
wherein the communication configuration indicates the presence of superposed channel transmissions.

4. A base station having a communication configuration, the base station comprising:
a transceiver;
a controller communicably coupled to the transceiver,
the controller configured to generate parity bits based on an information word, the controller configured to encode the parity bits based on the communication configuration of the base station, the encoded parity bits combined with the information word,
wherein the communication configuration is indicative of symmetry information for downlink and uplink frequency resources.

5. A base station having a communication configuration, the base station comprising:
a transceiver;
a controller communicably coupled to the transceiver,
the controller configured to generate parity bits based on an information word, the controller configured to encode the parity bits based on the communication configuration of the base station, the encoded parity bits combined with the information word, wherein the communication configuration indicative of spectrum adjacency information.

6. A base station having a communication configuration, the base station comprising:

a transceiver;

a controller communicably coupled to the transceiver, the controller configured to generate parity bits based on an information word, the controller configured to encode the parity bits based on the communication configuration of the base station, the encoded parity bits combined with the information word, wherein the communication configuration indicative of paired or unpaired spectrum operation.

* * * * *